(No Model.)
G. W. MILTIMORE.
CAR WHEEL.
No. 261,944. Patented Aug. 1, 1882.
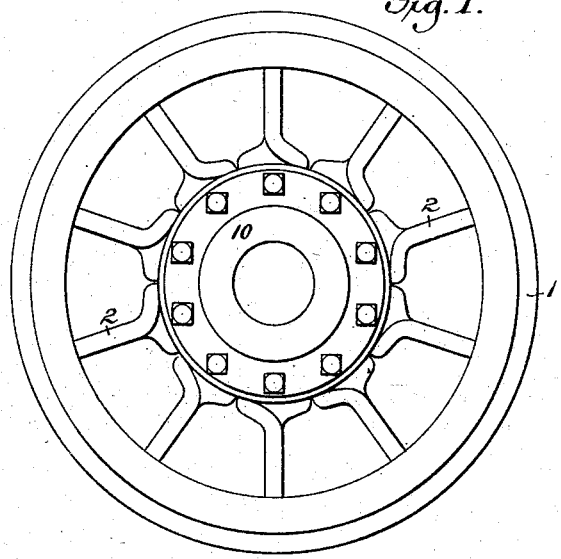
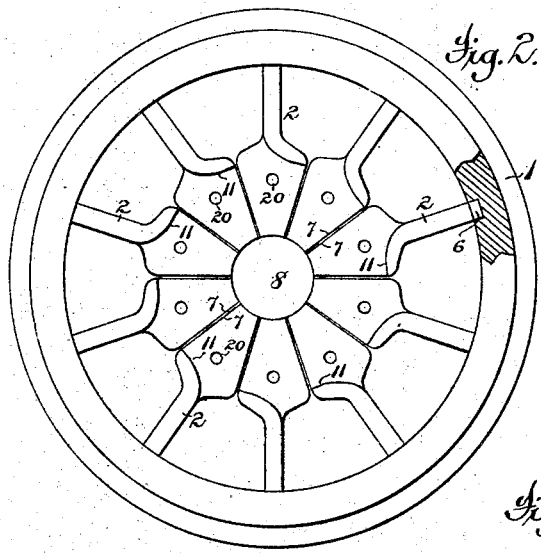
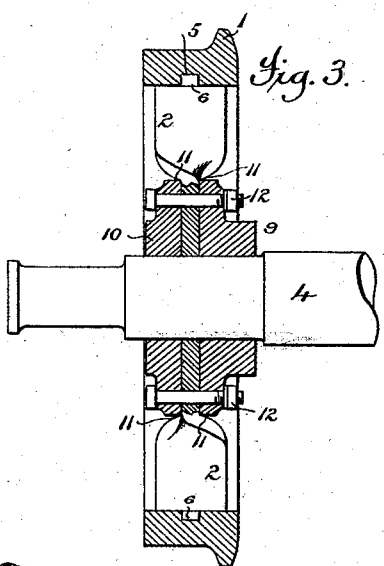
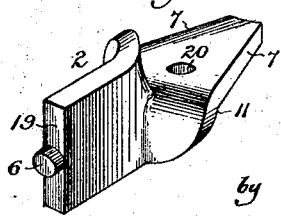
Attest:
Geo. H. Graham
T. H. Palmer
Inventor,
George W. Miltimore,
by Munson & Philipp
Att'ys.

UNITED STATES PATENT OFFICE.

GEORGE W. MILTIMORE, OF CHICAGO, ILLINOIS.

CAR-WHEEL.

SPECIFICATION forming part of Letters Patent No. 261,944, dated August 1, 1882.

Application filed November 12, 1881. (No model.)

*To all whom it may concern:*

Be it known that I, GEORGE W. MILTIMORE, a citizen of the United States, residing in the city of Chicago, county of Cook, and State of Illinois, have invented certain new and useful Improvements in Car-Wheels and Methods of Making the Same, fully described and represented in the following specification and the accompanying drawings, forming a part of the same.

Wheels for railway-cars were formerly almost universally made of cast-iron and in a single piece. To cure many disadvantages attending the use of wheels made of this material and in this manner, principal among which is their liability to crack, particularly in cold weather, it has in recent years been found desirable to make wheels by building them up from separate parts, and this has resulted either in defective or costly constructions.

My invention relates to this last-named class of wheels, and its object is to construct a wheel which shall overcome the dangerous defects of the older structures and avoid the great expense attending the production of the more approved wheels.

To this end it consists in producing a wheel the spokes of which are cheaply made from commercial bars twisted in a peculiar way to form their bearing-surfaces, and in certain details of construction, all of which is too particularly hereinafter set forth to need further preliminary description.

In said drawings, Figure 1 is a side elevation of my improved car-wheel. Fig. 2 is a side elevation of the wheel with one part of the hub removed and a portion of the rim broken away to show the joint between one of the spokes and the rim; Fig. 3, a transverse vertical section of the wheel, showing the axle in position; and Fig. 4, a perspective view of one of the spokes.

The rim of the wheel is made of steel or wrought-iron, and is of the usual shape to enable it to run properly upon the track-rails. Around its interior periphery it is provided with a series of mortises, 5, which receive the tenons 6 of the spokes. The spokes 2 are made from ordinary flat commercial bars of iron of suitable size, one end being provided with the tenon 6, to enter the mortise 5 in the rim, and a straight surface, 19, to bear against the inner periphery of the rim, the other end being cut away at its edges 7, so as to form substantially a section of a circle, the piece being then twisted at about mid-length by giving it a quarter-twist, as clearly shown in Fig. 4.

When a series of spokes of the construction just described have their tenons entered into the rim and are depressed and assembled in a radial series within said rim they will present the appearance shown in Fig. 2, their beveled inner ends, 7, fitting together like the sections of a circle and forming a flat even surface on opposite sides. When the wheel is in this condition I force a mandrel through the opening 8. This mandrel must be of sufficient size to drive each one of the spokes outward and seat it firmly against the rim. I then, with a suitable instrument, cut away the shoulders 11 of the spokes, so that they will present perfect circular bearing-seats on opposite sides. The hub plates 9 and 10 are then placed over the mandrel and pressed into the proper position within said circular bearing-seats, thus resting against the shoulders of the spokes and operating to hold them outwardly in the position to which they have been driven. Holes 20 are then bored through the hub-plates and spokes, and each spoke is then secured in place and to the hub-plates by the bolts 12, which are fastened either by riveting or by the nuts, as shown in Fig. 3.

I would here remark that it is not necessary that there should be a bolt for each spoke. A less number will often be found sufficient to hold the wheel firmly together, the intervening unbolted spokes being confined by the hub-plates. After the hub-plates have been bolted in place the mandrel is removed and the center opening or axle-bearing, 8, is reamed out to the desired size, after which the axle 4 is forced into position by hydraulic or other pressure, and the wheel is complete.

It is to be remarked that the spokes should be cut of such a length and the hub-plates made with a central opening of such a size that the opening 8, when the mandrel is forced through it, will be considerably smaller in size than it is designed to be when the wheel is finished. This will permit of great force being used to drive all snugly home, even though there may be a variation in their lengths and admit a marring of their ends without injury, though it will entail considerable reaming out to produce a perfect circular bearing that all the spokes may rest firmly upon and bear completely on the axle when it is finally driven home.

While the method just described is particularly adapted to the manufacture of wheels for railway-cars, it is evident that it is applicable to the manufacture of wheels for rolling-stock generally.

Although the preferred structure is that in which the inner ends of the spokes have a solid bearing, they may be shortened and depend upon the shoulders 11 and hub-plates for their support without departing from the spirit of my invention.

The shoulders of the spokes for the hub-plates might be straight and the hub-plates given a polygonal form, and still be entirely within the scope of my invention; but this form of wheel would involve enhanced cost of construction.

The method of assembling and securing the different parts of the wheel is not herein claimed, as that will form the subject-matter of a separate application for United States Letters Patent. A wheel embodying the present invention, but adapted to revolve about its axle, will also form the subject-matter of a future application for Letters Patent of the United States.

What I claim is—

1. The herein-described metal wheel, consisting of a rim, spokes provided with bearing-shoulders against which hub-plates rest on opposite sides, the inwardly-projecting ends of which spokes bear upon the axle, substantially as described.

2. The spoke 2, made of bar-iron twisted by a quarter-turn to form the shoulders 11, and cut away at its inner end, as shown, so that the ends of all the spokes will form a common bearing, substantially as described.

In testimony whereof I have hereunto set my hand in the presence of two subscribing witnesses.

GEORGE W. MILTIMORE.

Witnesses:
   JAMES K. BATCHELDER,
   A. D. CANFIELD.